(12) United States Patent
Nakamura (10) Patent No.: US 12,228,515 B2
(45) Date of Patent: Feb. 18, 2025

(54) INSPECTION APPARATUS AND INSPECTION METHOD

(71) Applicant: HAMAMATSU PHOTONICS K.K., Hamamatsu (JP)

(72) Inventor: Tomonori Nakamura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 628 days.

(21) Appl. No.: 17/441,712

(22) PCT Filed: Jan. 29, 2020

(86) PCT No.: PCT/JP2020/003249
§ 371 (c)(1),
(2) Date: Sep. 22, 2021

(87) PCT Pub. No.: WO2020/195137
PCT Pub. Date: Oct. 1, 2020

(65) Prior Publication Data
US 2022/0196551 A1    Jun. 23, 2022

(30) Foreign Application Priority Data
Mar. 28, 2019    (JP) .................................. 2019-062983

(51) Int. Cl.
*G01N 21/64* (2006.01)
*G06T 7/00* (2017.01)

(52) U.S. Cl.
CPC ....... *G01N 21/643* (2013.01); *G01N 21/6456* (2013.01); *G06T 7/0004* (2013.01); *G01N 21/6489* (2013.01); *G06T 2207/30148* (2013.01)

(58) Field of Classification Search
None
See application file for complete search history.

(56) References Cited

U.S. PATENT DOCUMENTS 6,326,628 B1 * 12/2001 Kimura .............. G01N 21/6456
250/584
9,575,302 B2 * 2/2017 Booth ................ G02B 21/0072
(Continued)

FOREIGN PATENT DOCUMENTS

CN    101197301 A    6/2008
CN    103765567 A    4/2014
(Continued)

OTHER PUBLICATIONS

International Preliminary Report on Patentability mailed Oct. 7, 2021 for PCT/JP2020/003249.

*Primary Examiner* — Brian R Gordon
(74) *Attorney, Agent, or Firm* — Faegre Drinker Biddle & Reath LLP (57) ABSTRACT

An inspection apparatus is an inspection apparatus for inspecting a sample in which a plurality of light-emitting elements including a first light-emitting element and a second light-emitting element arranged around the first light-emitting element is formed, the inspection apparatus including an excitation light source that generates excitation light to irradiate the sample, a camera that images fluorescence from the sample, and a determining unit that calculates a relative luminance of fluorescence from the first light-emitting element based on the fluorescence from the first light-emitting element and fluorescence from the second light-emitting element imaged by the camera, and compares a calculated value based on an absolute luminance and the relative luminance of the fluorescence from the first light-emitting element with a predetermined threshold value, thereby determining a quality of the first light-emitting element.

10 Claims, 6 Drawing Sheets

(56) References Cited

U.S. PATENT DOCUMENTS

| | | | | |
|---|---|---|---|---|
| 12,072,289 | B2* | 8/2024 | Nakamura | G01N 21/64 |
| 2004/0239916 | A1* | 12/2004 | Seino | G01N 15/1433 |
| | | | | 356/28.5 |
| 2005/0211912 | A1* | 9/2005 | Fox | B82Y 10/00 |
| | | | | 250/458.1 |
| 2006/0247535 | A1* | 11/2006 | Sendai | A61B 1/0638 |
| | | | | 600/476 |
| 2008/0251689 | A1* | 10/2008 | Yamashita | G01N 21/6456 |
| | | | | 250/201.3 |
| 2009/0239257 | A1* | 9/2009 | Levine | G01N 21/6428 |
| | | | | 435/288.7 |
| 2010/0022893 | A1* | 1/2010 | Hart | G01B 11/022 |
| | | | | 600/245 |
| 2011/0042580 | A1* | 2/2011 | Wilson | G01N 21/6456 |
| | | | | 250/200 |
| 2011/0049384 | A1* | 3/2011 | Yared | G01N 21/6456 |
| | | | | 382/128 |
| 2011/0096967 | A1* | 4/2011 | Oda | G01N 21/6456 |
| | | | | 250/227.24 |
| 2013/0230866 | A1* | 9/2013 | Miyashita | G01N 33/94 |
| | | | | 435/7.1 |
| 2014/0234994 | A1 | 8/2014 | Abe | |
| 2014/0285648 | A1* | 9/2014 | Jeong | H04N 23/56 |
| | | | | 348/77 |
| 2014/0347676 | A1* | 11/2014 | Velten | G01N 21/55 |
| | | | | 356/402 |
| 2016/0270663 | A1* | 9/2016 | Ikehara | A61B 5/0042 |
| 2017/0017069 | A1* | 1/2017 | Siegel | A61B 5/0075 |
| 2017/0343475 | A1* | 11/2017 | Yamada | G01N 21/6428 |
| 2018/0061085 | A1* | 3/2018 | Ikami | H04N 1/4076 |
| 2018/0067046 | A1* | 3/2018 | Imagawa | G01N 21/64 |
| 2019/0021602 | A1* | 1/2019 | Hurley | G01N 21/6456 |
| 2019/0212266 | A1* | 7/2019 | Baker | G01N 21/6454 |
| 2020/0177822 | A1* | 6/2020 | Ohyama | G01N 21/47 |
| 2020/0337559 | A1* | 10/2020 | Yared | A61K 49/0017 |
| 2020/0379227 | A1* | 12/2020 | Calvin | G02B 21/0032 |
| 2021/0026121 | A1* | 1/2021 | Yamamoto | G01N 21/6456 |
| 2021/0097961 | A1* | 4/2021 | Ohyama | G01S 17/89 |
| 2021/0192786 | A1* | 6/2021 | Ozaki | G01N 33/48 |
| 2021/0333181 | A1* | 10/2021 | Zhang | G01N 3/068 |
| 2022/0034809 | A1* | 2/2022 | Hayakawa | G06N 20/00 |
| 2022/0280042 | A1* | 9/2022 | Antaris | G01N 21/6408 |
| 2023/0221255 | A1* | 7/2023 | Allier | G06T 17/20 |
| | | | | 250/459.1 |
| 2023/0333011 | A1* | 10/2023 | Dev | G01J 3/2823 |

FOREIGN PATENT DOCUMENTS

| | | |
|---|---|---|
| CN | 107110782 A | 8/2017 |
| JP | S63-250835 A | 10/1988 |
| JP | 2008-145226 A | 6/2008 |
| JP | 2015-010834 A | 1/2015 |
| JP | 2015-148447 A | 8/2015 |
| JP | 2019-023801 A | 2/2019 |
| TW | 201333453 A | 8/2013 |
| TW | 201447221 A | 12/2014 |
| TW | I589865 B | 7/2017 |

* cited by examiner

INSPECTION APPARATUS AND INSPECTION METHOD

TECHNICAL FIELD

An aspect of the present invention relates to an inspection apparatus and an inspection method.

BACKGROUND ART

As a method for determining the quality of a light-emitting element group formed on a wafer, there has been a known method of observing the photoluminescence emitted by a light-emitting element and determining the quality of the light-emitting element based on a luminance of the photoluminescence (for example, see Patent Literature 1).

CITATION LIST

Patent Literature

Patent Literature 1: Japanese Unexamined Patent Publication No. 2015-148447

SUMMARY OF INVENTION

Technical Problem

Here, for example, a luminance distribution of each light-emitting element on the wafer may become gentle due to process unevenness (film thickness, impurity concentration, etc.). In this case, it is difficult to accurately determine the quality of the light-emitting element based only on the absolute value of the luminance.

As a method that can solve the above-mentioned problem, a method is considered in which a quality of a light-emitting element to be determined is determined based on a ratio of a luminance (that is, relative luminance) of the light-emitting element to be determined to an average luminance of a light-emitting element group including the light-emitting element to be determined and a light-emitting element around the light-emitting element. However, for example, when the light-emitting element group including the light-emitting element to be determined (the light-emitting element to be determined and the light-emitting element around the light-emitting element) is covered with dust, etc., and becomes a dark region, the relative luminance of the light-emitting element to be determined does not decrease even though the absolute values of the luminance values of all the light-emitting elements included in the light-emitting element group are extremely low, and thus there is concern that the light-emitting element to be determined may be determined to be a non-defective product.

An aspect of the invention has been made in view of the above circumstances, and an object of the invention is to determine the quality of a light-emitting element with high accuracy based on the photoluminescence.

Solution to Problem

An inspection apparatus according to an aspect of the invention is an inspection apparatus for inspecting an object in which a plurality of light-emitting elements including a first light-emitting element and a second light-emitting element arranged around the first light-emitting element is formed, the inspection apparatus including an excitation light source that generates excitation light to irradiate the object, an imaging unit that images fluorescence from the object, and a determining unit that calculates a relative luminance of fluorescence from the first light-emitting element based on the fluorescence from the first light-emitting element and fluorescence from the second light-emitting element imaged by the imaging unit, and compares a calculated value based on an absolute luminance and the relative luminance of the fluorescence from the first light-emitting element with a predetermined threshold value, thereby determining a quality of the first light-emitting element.

In the inspection apparatus according to the aspect of the invention, the relative luminance of the first light-emitting element is calculated based on the fluorescence of the first light-emitting element and the fluorescence of the second light-emitting element irradiated with excitation light, a calculated value based on the relative luminance and the absolute luminance of the fluorescence of the first light-emitting element is compared with a predetermined threshold value, and the quality of the first light-emitting element is determined. For example, when the light-emitting element to be determined and the light-emitting element around the light-emitting element (light-emitting element group) are covered with dust, etc., and become a dark region, the relative luminance of the light-emitting element to be determined does not decrease even though the absolute luminance of the florescence of all the light-emitting elements included in the light-emitting element group is extremely low (that is, defective products). Thus, when the quality is determined based on the relative luminance, there is concern that the light-emitting element to be determined may be determined to be a non-defective product. In this regard, in the inspection apparatus according to the aspect of the invention, the quality of the light-emitting element is determined based on the calculated value calculated from the absolute luminance and the relative luminance in consideration of not only the relative luminance but also the absolute luminance. Thus, when the light-emitting element group becomes the dark region as described above, a light-emitting element having an extremely low absolute luminance even though a relative luminance is high may be determined to be a defective product. That is, with the inspection apparatus according to the aspect of the invention, it is possible to accurately determine the quality of the light-emitting element based on photoluminescence.

In the inspection apparatus, the determining unit may calculate a product of the absolute luminance and the relative luminance of the fluorescence from the first light-emitting element as the calculated value, and determine the first light-emitting element to be a defective product when the calculated value is smaller than the threshold value. When the product of an absolute luminance and a relative luminance is calculated, a calculated value of a light-emitting element whose absolute luminance is extremely low (close to 0) may be appropriately set to a small value, so that the light-emitting element can be appropriately determined to be a defective product.

In the inspection apparatus, the determining unit may calculate a product of the absolute luminance to an mth power (m is a positive number) and the relative luminance to an nth power (n is a positive number) of the fluorescence from the first light-emitting element as the calculated value, and determine the first light-emitting element to be a defective product when the calculated value is smaller than the threshold value. When the product of the powers of the absolute luminance and the relative luminance is calculated, a calculated value of a light-emitting element whose absolute luminance is extremely low (close to 0) can be set to a significantly smaller value, and the light-emitting element can be appropriately determined to be a defective product.

The inspection apparatus may further include a correcting unit that corrects the fluorescence from the first light-emitting element in consideration of an influence of fluorescence from a light-emitting element arranged around the first light-emitting element. It is considered that the fluorescence of the first light-emitting element imaged by the imaging unit is affected by the fluorescence from the light-emitting element arranged around the first light-emitting element. In this regard, when the fluorescence from the first light-emitting element is corrected in consideration of the influence of the fluorescence from the surrounding light-emitting element, the quality of the first light-emitting element can be determined with higher accuracy based on the original fluorescence from the first light-emitting element.

In the inspection apparatus, the determining unit may acquire fluorescence from a light-emitting element from a region excluding an edge portion of the light-emitting element in a region of the object imaged by the imaging unit. In general, the light-emitting element is formed in a mesa shape in the object and has an inclined portion at the edge portion. Such an inclined portion reflects light, and when the luminance is calculated including the inclined portion, there is concern that the luminance of the fluorescence from the light-emitting element cannot be appropriately calculated. In this regard, by acquiring fluorescence (fluorescence from the light-emitting element) from the region excluding the edge portion such as the inclined portion, it is possible to appropriately acquire the fluorescence from the light-emitting element by eliminating the influence of the inclined portion.

An inspection method according to an aspect of the invention is a method of inspecting an object in which a plurality of light-emitting elements including a first light-emitting element and a second light-emitting element arranged around the first light-emitting element is formed, the method including an irradiation step of irradiating the object with excitation light, an imaging step of imaging fluorescence from the object, a relative luminance calculation step of calculating a relative luminance of fluorescence from the first light-emitting element based on the fluorescence from the first light-emitting element and fluorescence from the second light-emitting element imaged in the imaging step, and a determination step of determining a quality of the first light-emitting element by comparing a calculated value based on an absolute luminance and the relative luminance of the fluorescence from the first light-emitting element with a predetermined threshold value.

In the determination step of the inspection method, a product of the absolute luminance and the relative luminance of the fluorescence from the first light-emitting element may be calculated as the calculated value, and the first light-emitting element may be determined to be a defective product when the calculated value is smaller than the threshold value.

In the determination step of the inspection method, a product of the absolute luminance to an mth power (m is a positive number) and the relative luminance to an nth power (n is a positive number) of the fluorescence from the first light-emitting element may be calculated as the calculated value, and the first light-emitting element may be determined to be a defective product when the calculated value is smaller than the threshold value.

The inspection method may further include a correction step of correcting the fluorescence from the first light-emitting element in consideration of an influence of fluorescence from a light-emitting element arranged around the first light-emitting element after the imaging step and before the relative luminance calculation step.

In the relative luminance calculation step of the inspection method, fluorescence from a light-emitting element may be acquired from a region excluding an edge portion of the light-emitting element in a region of the object imaged in the imaging step.

Advantageous Effects of Invention

According to an aspect of the invention, it is possible to determine the quality of a light-emitting element with high accuracy based on the photoluminescence.

DESCRIPTION OF EMBODIMENTS

Hereinafter, an embodiment of the invention will be described in detail with reference to the drawings. Note that in each figure, the same reference symbols are assigned to the same or corresponding parts, and duplicate description will be omitted.

Figure 1:
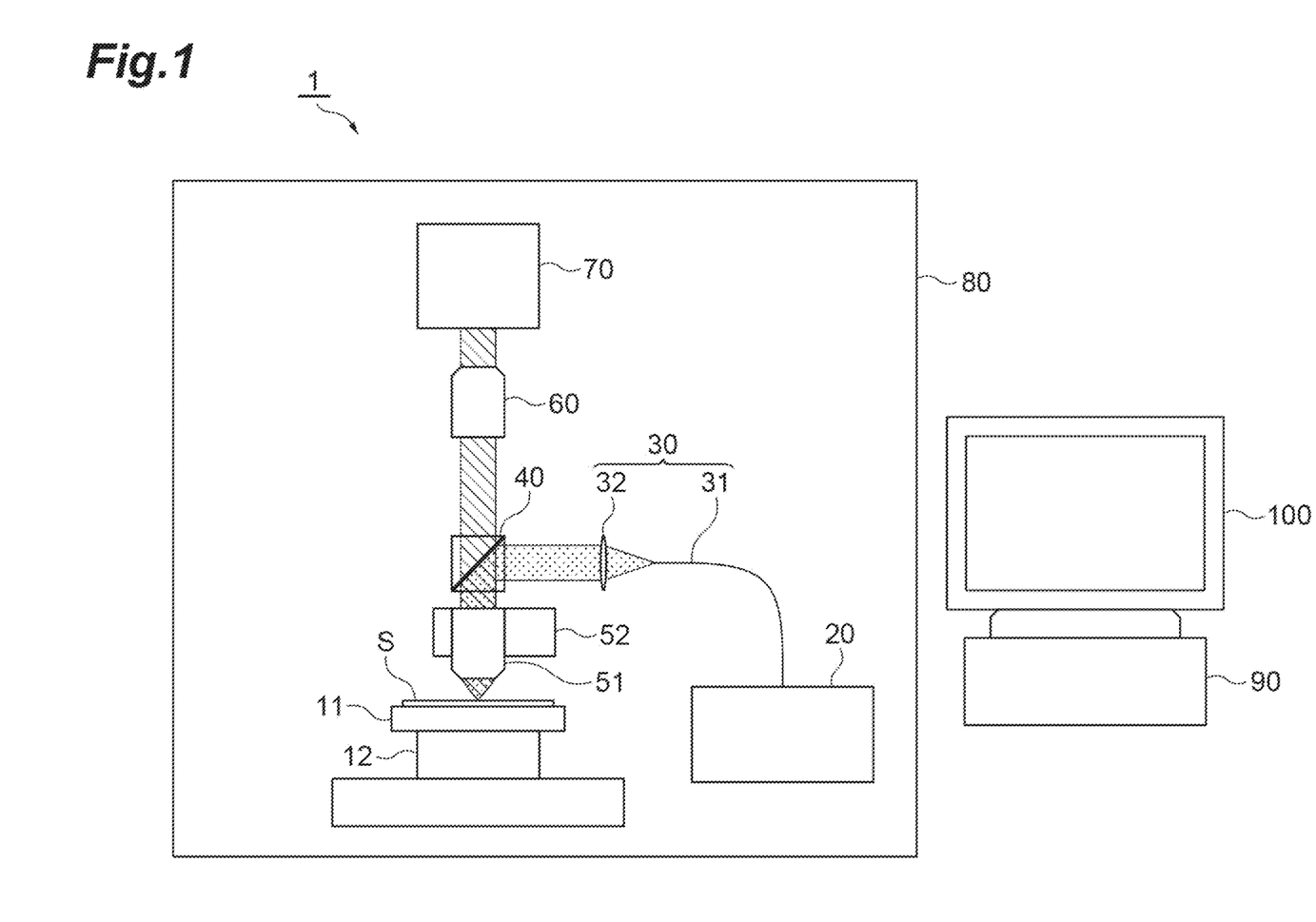
FIG. 1 is a configuration diagram of an inspection apparatus according to an embodiment of the invention.

FIG. 1 is a configuration diagram of an inspection apparatus 1 according to the present embodiment. The inspection apparatus 1 is a apparatus that inspects a sample S (object). For example, the sample S is a semiconductor apparatus in which a plurality of light-emitting elements is formed on a wafer. Hereinafter, a description will be given on the assumption that the plurality of light-emitting elements of the sample S includes at least a first light-emitting element and a plurality of second light-emitting elements arranged around the first light-emitting element (specifically, arranged adjacent to the first light-emitting element). Note that one second light-emitting element instead of the plurality of second light-emitting elements may be arranged around the first light-emitting element. The light-emitting element is, for example, a μLED, etc. The inspection apparatus 1 observes photoluminescence (specifically, fluorescence) for the plurality of light-emitting elements formed in the sample S, and determines a quality of each of the light-emitting elements based on luminance (specifically, absolute luminance and relative luminance) of photoluminescence corresponding to each light-emitting element. For example, it is possible to consider determining the quality of the light-emitting element by probing (that is, based on an electrical characteristic). However, for a fine LED such as a μLED, probing for performing measurement by applying a needle is physically difficult. In this regard, in the method for determining the quality of the light-emitting element based on photoluminescence according to the present embodiment, the quality of the light-emitting element can be determined by acquiring a fluorescence image, so that the qualities of a large number of light-emitting elements can be efficiently determined without being bound by physical restrictions. In the following, the absolute luminance may be simply referred to as "luminance".

As illustrated in FIG. 1, the inspection apparatus 1 includes a chuck 11, an XY stage 12, an excitation light source 20, an optical system 30, a dichroic mirror 40, an objective lens 51, a Z stage 52, an imaging lens 60, a camera 70 (imaging unit), a dark box 80, a control apparatus 90, and a monitor 100. The dark box 80 accommodates components other than the control apparatus 90 and the monitor 100 among the components described above, and is provided to prevent an influence of external light on each of the accommodated components. Note that the respective components accommodated in the dark box 80 may be mounted on a vibration isolation table to improve the quality of an image captured by the camera 70 (improve the image quality and prevent image misalignment).

The chuck 11 is a holding member that holds the sample S. The chuck 11 holds the sample S by, for example, vacuum-sucking the wafer of the sample S. The XY stage 12 is a stage for moving the chuck 11 holding the sample S in an XY direction (front-back and right-left directions), that is, in a direction along a mounting surface of the sample S on the chuck 11. The XY stage 12 moves the chuck 11 in the XY direction so that each of the plurality of light-emitting elements is sequentially set as an irradiation region of excitation light according to control of the control apparatus 90. Note that the inspection apparatus 1 may further include a rotating stage (θ stage, not illustrated). Such a rotating stage may be provided, for example, above the XY stage 12 and below the chuck 11, or may be provided integrally with the XY stage 12. The rotating stage is used to accurately align vertical and horizontal positions of the sample S. By providing the rotating stage, it is possible to shorten a time for alignment, etc. and to shorten a total time for data processing.

The excitation light source 20 is a light source that generates excitation light to irradiate the sample S and irradiates the sample S with excitation light. The excitation light source 20 may be a light source capable of generating light including a wavelength that excites the light-emitting element of the sample S, and is, for example, a laser light source, an LED, an SLD, a mercury lamp, a halogen lamp, a plasma light source, etc. Note that the inspection apparatus 1 may further include a sensor that monitors the illumination luminance to keep a luminance of excitation light emitted from the excitation light source 20 constant.

The optical system 30 includes an optical fiber cable 31 and a light guide lens 32. The optical fiber cable 31 is an optical fiber cable for guiding light connected to the excitation light source 20. As the optical fiber cable 31, for example, a polarization preservation fiber, a single mode fiber, etc. can be used. The light guide lens 32 is, for example, a single or composite convex lens, and guides excitation light arriving through the optical fiber cable 31 in a direction of the dichroic mirror 40. Note that, to prevent a wavelength of excitation light emitted from the excitation light source 20 from changing over time, the inspection apparatus 1 may include a band-pass filter (not illustrated) between the excitation light source 20 and the dichroic mirror 40.

The dichroic mirror 40 is a mirror made of a special optical material, and reflects light of a specific wavelength and transmits light of other wavelengths. Specifically, the dichroic mirror 40 is configured to reflect excitation light in a direction of the objective lens 51 and transmit photoluminescence (specifically, fluorescence) from the light-emitting element, which is light in a wavelength band different from that of excitation light, in a direction of the imaging lens 60.

The objective lens 51 has a configuration for observing the sample S, and concentrates excitation light guided by the dichroic mirror 40 on the sample S. The Z stage 52 adjusts the focus by moving the objective lens 51 in a Z direction (vertical direction), that is, in a direction intersecting the mounting surface of the sample S on the chuck 11. The imaging lens 60 is a lens that forms an image of fluorescence from the sample S and guides the fluorescence to the camera 70.

The camera 70 is an imaging unit that images the fluorescence from the sample S. Specifically, the camera 70 images the fluorescence by detecting an image formed by the imaging lens 60. The camera 70 outputs a fluorescence image, which is an imaging result, to the control apparatus 90. The camera 70 is an area image sensor such as a CCD or CMOS. Further, the imaging unit may include a line sensor or a time delay integration (TDI) sensor instead of the camera 70.

The control apparatus 90 controls the XY stage 12, the excitation light source 20, the Z stage 52, and the camera 70. Specifically, the control apparatus 90 adjusts an irradiation region of excitation light (irradiation region in the sample S) by controlling the XY stage 12. The control apparatus 90 adjusts the focus related to excitation light by controlling the Z stage 52. The control apparatus 90 adjusts emission of excitation light and a wavelength, amplitude, etc. of excitation light by controlling the excitation light source 20. The control apparatus 90 performs adjustment related to acquisition of a fluorescence image by controlling the camera 70. Further, the control apparatus 90 determines the quality of the light-emitting element of the sample S based on the fluorescence image captured by the camera 70 (details will be described later). Note that the control apparatus 90 is a computer, and is physically configured to include a memory such as a RAM or a ROM, a processor (arithmetic circuit) such as a CPU, a communication interface, and a storage unit such as a hard disk. Examples of the control apparatus 90 include a personal computer, a cloud server, and a smart apparatus (smartphone, tablet terminal, etc.). The control apparatus 90 functions by executing a program stored in a memory on a CPU of a computer system. The monitor 100 is a display apparatus that displays a fluorescence image which is a measurement result.

Figure 2:
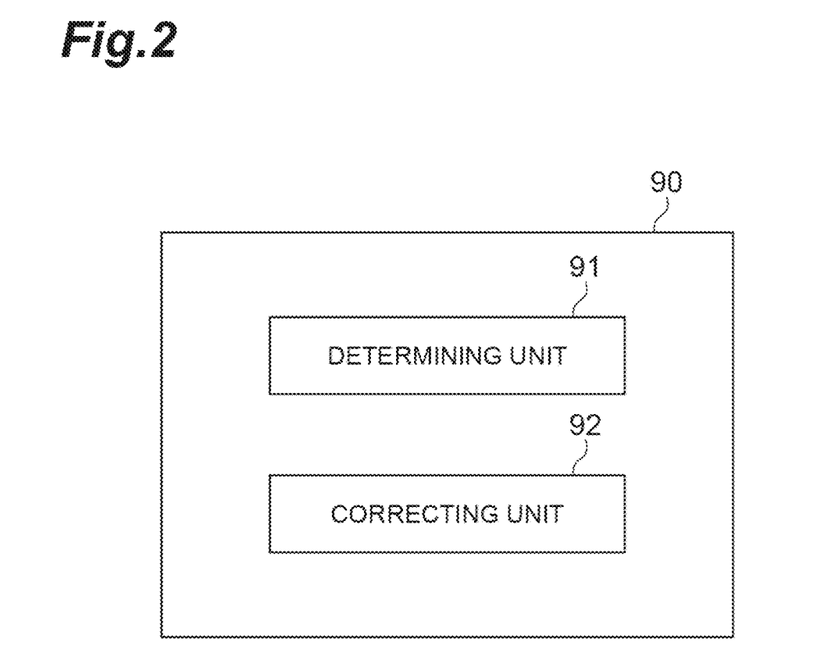
FIG. 2 is a functional block diagram of a control apparatus included in the inspection apparatus of FIG. 1.

Next, a description will be given of a function of the control apparatus 90 related to determination of the quality of the light-emitting element with reference to FIG. 2. FIG. 2 is a functional block diagram of the control apparatus 90 included in the inspection apparatus 1 of FIG. 1. Note that the functional block of FIG. 2 illustrates only the function related to determination of the quality of the light-emitting element among functions of the control apparatus 90.

As illustrated in FIG. 2, the control apparatus 90 includes a determining unit 91 and a correcting unit 92 as components related to determination of the quality of the light-emitting element.

The determining unit 91 performs a luminance derivation process for deriving an absolute luminance of fluorescence of the light-emitting element, and a determination process for determining the quality of the light-emitting element after the luminance is corrected by the correcting unit 92. In the luminance derivation process, the determining unit 91 derives the luminance (absolute luminance) of the fluorescence of each light-emitting element included in an irradiation region of excitation light based on a fluorescence image captured by the camera 70. First, the determining unit 91 identifies a luminance of each region in the fluorescence image. At this point, each luminance is not associated with each light-emitting element. Then, the determining unit 91 associates the luminance with position information of the light-emitting element using, for example, a pattern recognition technology. In this way, the determining unit 91 derives the luminance of the fluorescence from each light-emitting element.

Figure 3:
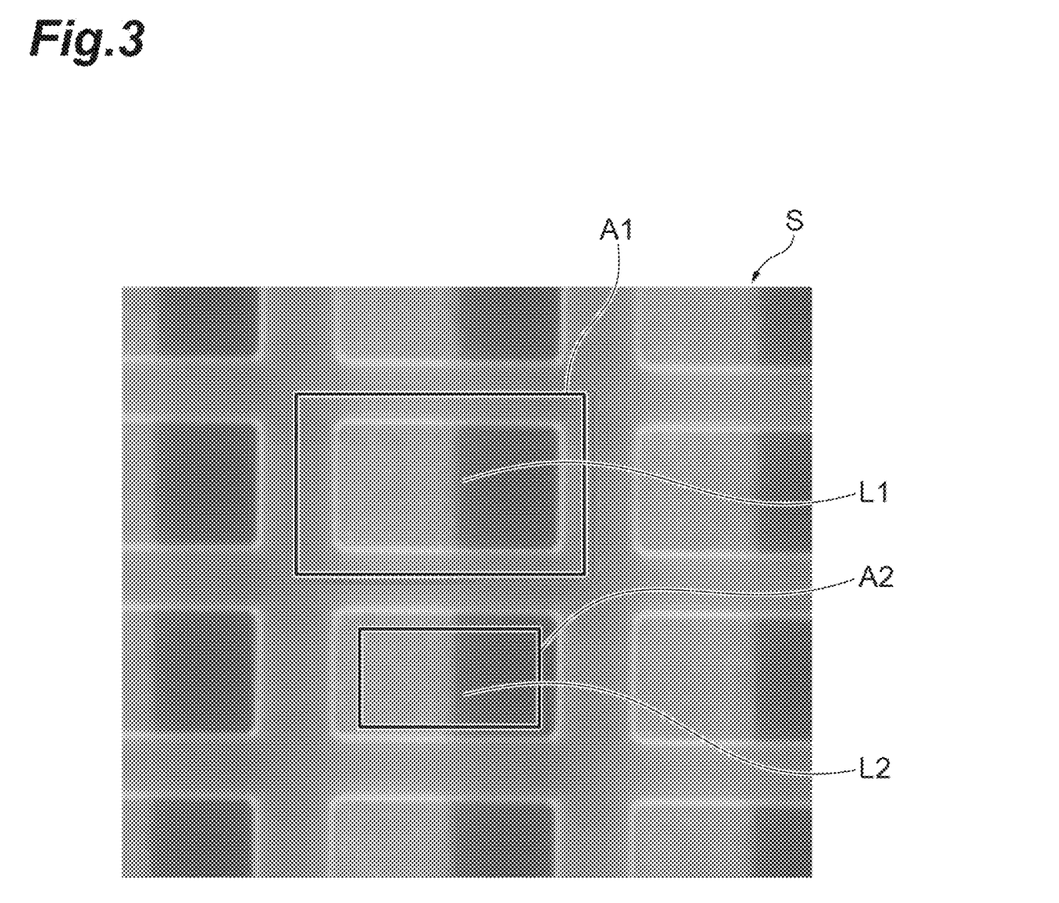
FIG. 3 is a diagram for description of a setting example of a measurement region.

Note that the determining unit 91 may acquire the fluorescence of the light-emitting element from a region excluding an edge portion of the light-emitting element in the region of the sample S imaged by the camera 70. That is, the determining unit 91 may set the region (measurement region) for acquiring fluorescence so as not to include the edge portion of the light-emitting element. The light-emitting element is generally formed in a mesa shape on a wafer and has an inclined portion at the edge portion. Since such an inclined portion easily reflects light emission from the outside, when the luminance is calculated including the inclined portion, there is concern that the luminance of the fluorescence from the light-emitting element cannot be appropriately derived. In this regard, the determining unit 91 can appropriately acquire the luminance of the fluorescence from the light-emitting element by setting the region (measurement region) for acquiring the fluorescence from the light-emitting element so that the inclined portion as described above is not included. FIG. 3 is a diagram for description of a setting example of the measurement region. FIG. 3 shows a plurality of light-emitting elements formed in the sample S. With regard to a light-emitting element L1 shown in FIG. 3, a region A1 including the inclined portion around the light-emitting element L1 is defined as the measurement region. In this case, as described above, there is concern that the luminance of the fluorescence from the light-emitting element L1 cannot be appropriately derived due to reflection at the inclined portion. In this regard, with regard to a light-emitting element L2 shown in FIG. 3, a region A2 not including the region of the sample S that is not the light-emitting element L2 is defined as the measurement region. In this case, the luminance of the fluorescence from the light-emitting element L2 can be derived more accurately without being affected by reflection at the inclined portion. The luminance derivation process has been described. The determination process of the determining unit 91 will be described after describing a function of the correcting unit 92.

The correcting unit 92 corrects fluorescence from a certain light-emitting element (first light-emitting element) in consideration of an influence of fluorescence from a light-emitting element arranged around the light-emitting element. A luminance distribution of the fluorescence of the light-emitting element is affected by the fluorescence from the light-emitting element arranged in the periphery. Specifically, for example, when the sample S is a semiconductor apparatus in which a GaN μLED chip is formed on a sapphire substrate (wafer), it is conceivable that when fluorescence is radiated not only to a space side but also to a back surface side of the wafer, re-reflected light from the back surface side may be reflected in the camera 70, and the luminance distribution of the light-emitting element may be affected by the light-emitting element in the periphery and become smoother than the original (when not affected). In addition, the edge portion not affected by the light-emitting element arranged in the periphery is observed darker than the original. To solve these problems, the correcting unit 92 performs the following edge enhancement processing. In the determination process of the determining unit 91, which will be described later, the luminance (absolute luminance) after the edge enhancement process by the correcting unit 92 is used.

Figure 4:
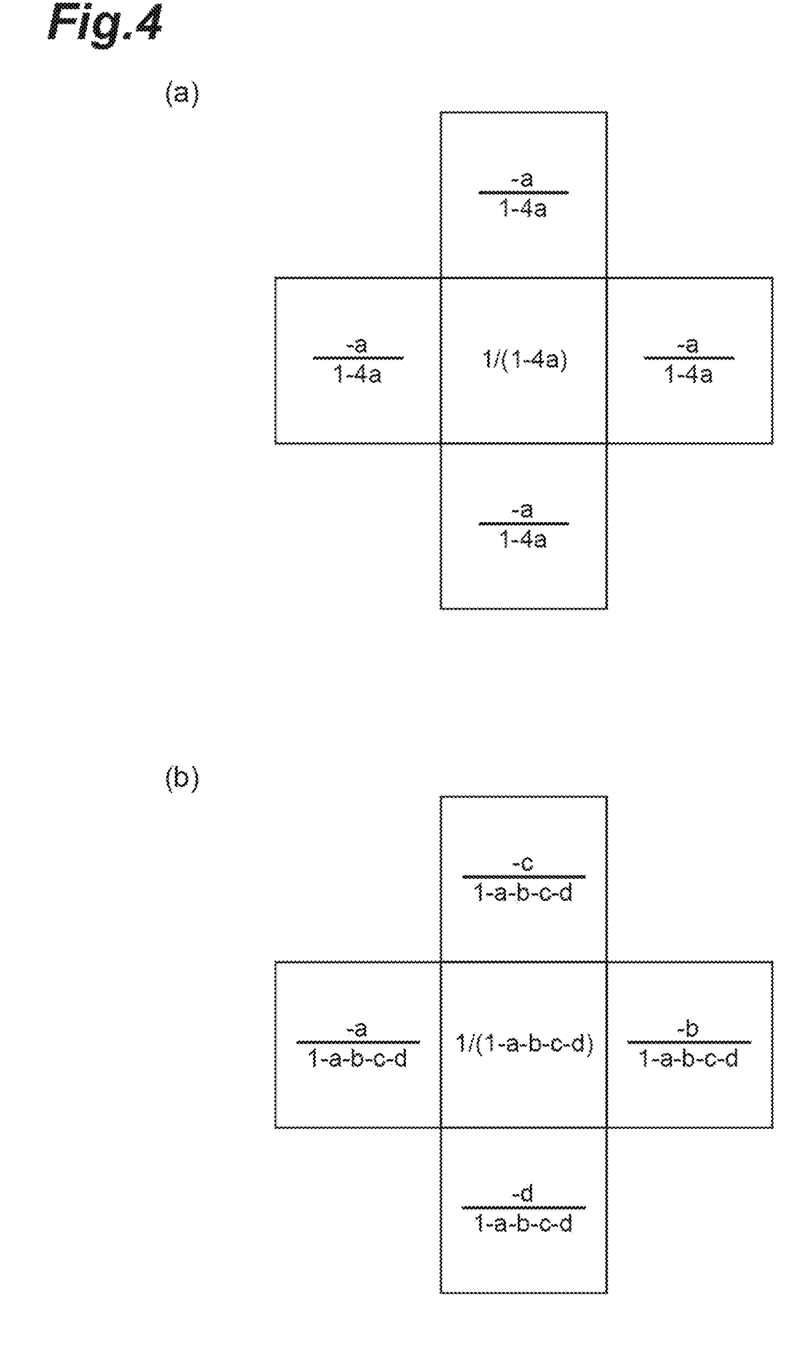
FIG. 4 is a diagram for description of an edge enhancement process.

In the correcting unit 92, for example, when a measured value of a luminance of fluorescence of a light-emitting element at coordinates (i, j) is 1(i, j), as illustrated in FIG. 4(*a*), assuming that the light-emitting element is affected by the same ratio "a" for each luminance from light-emitting elements at coordinates (i, j−1), (i, j+1), (i−1, j), and (i+1, j) in four directions around the light-emitting element (a certain amount of brightness is mixed in), and, on the contrary, affects the surrounding light-emitting elements in the four directions by the same ratio "a" with respect to the luminance thereof (brightness spreads around and decreases), the measured value 1(i, j) of the luminance of the fluorescence of the light-emitting element at (i, j) and a calculated value 1'(i, j) of the luminance of the fluorescence of the light-emitting element at (i, j) considering the influence of the fluorescence from the light-emitting elements arranged in the periphery (that is, after correction) have a relationship shown by the following Equation (1).

$$1(i,j)=1'(i,j)(1-4a)+a(1(i-1,j)+1(i+1,j)+1(i,j-1)+1(i,j+1)) \quad (1)$$

Note that, originally, even though 1 of a(1(i−1,j)+1(i+1,j)+1(i, j−1)+1(i, j+1)) needs to be set to 1', since averaging is performed in the equation, the measured value 1 is used considering that there is no significant difference.

In the above example, the light-emitting elements around the light-emitting element at the coordinates (i, j) are symmetrically arranged, and the ratio of the affected luminance is constant at "a". However, for example, when the light-emitting elements in the periphery are asymmetrically arranged, as illustrated in FIG. 4(*b*), the ratio of the affected luminance is different for a to d, and the measured value 1(i, j) of the luminance of the fluorescence of the light-emitting element at (i, j) and the calculated value 1'(i, j) of the luminance of the fluorescence of the light-emitting element at (i, j) considering the influence of the fluorescence from the light-emitting elements arranged in the periphery (that is, after correction) have a relationship shown by the following Equation (2).

$$1(i,j)=1'(i,j)(1-a-b-c-d)+a(1(i-1,j))+b(1(i+1,j))+c(1(i,j-1))+d(1(i,j+1)) \quad (2)$$

In the determination process, the determining unit 91 determines the quality of the light-emitting element to be determined based on the fluorescence from the light-emitting element imaged by the camera 70. Specifically, the determining unit 91 calculates a relative luminance of fluorescence from the first light-emitting element (ratio of the luminance of the first light-emitting element to the average luminance of the light-emitting element group) based on the fluorescence from the first light-emitting element and the fluorescence from the plurality of second light-emitting elements arranged around the first light-emitting element. That is, the determining unit 91 extracts only a region including the first light-emitting element and the plurality of second light-emitting elements (that is, performs a mask process), and calculates a shift amount of the luminance of the fluorescence from the first light-emitting element (shift amount from a luminance average in a mask) as the relative luminance of the fluorescence from the first light-emitting element. For example, the number of light-emitting elements included in the mask is set to 5×5. Note that, as described above, the luminance (absolute luminance) in the determination process is the luminance after the edge enhancement process by the correcting unit 92.

The determining unit 91 calculates a calculated value L based on an absolute luminance P and a relative luminance Q of the fluorescence from the first light-emitting element. The determining unit 91 may calculate, for example, the product of the absolute luminance P and the relative luminance Q of the fluorescence from the first light-emitting element as the calculated value L. Further, the determining unit 91 may calculate the product of the absolute luminance P to the mth power (in is a positive number) and the relative luminance Q to the nth power (n is a positive number) of the fluorescence from the first light-emitting element as the calculated value L. In this case, the calculated value L is calculated by the following Equation (3). Note that the value of in may be set to, for example, 1 and the value of n may be set to, for example, 2.

$$L = P^m \times Q^n \tag{3}$$

Figure 5:
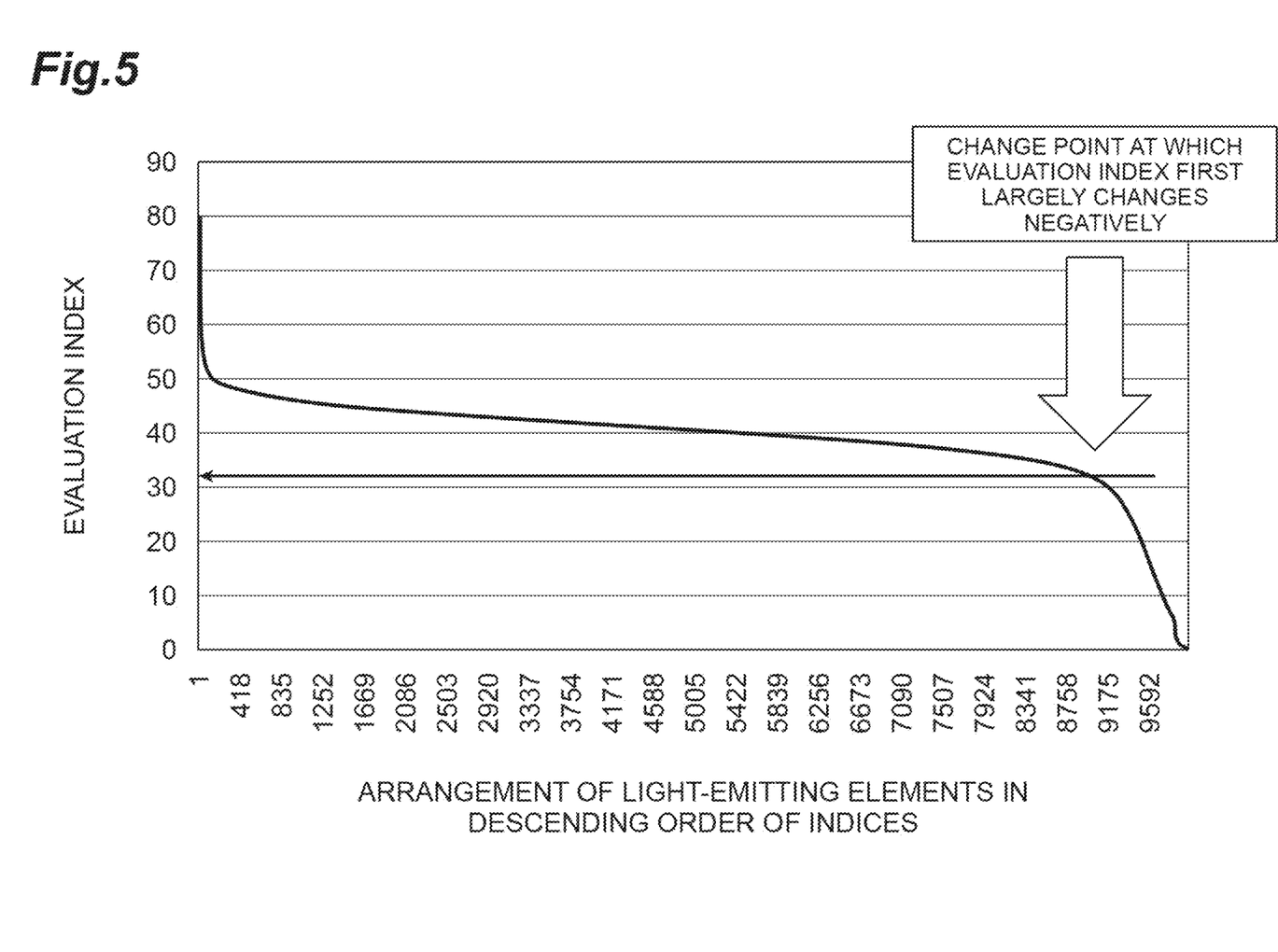
FIG. 5 is a diagram showing a sorting result for calculated values.

The determining unit 91 calculates the above-mentioned calculated value L for each light-emitting element included in the same fluorescence image. Further, the determining unit 91 acquires a new fluorescence image by changing the irradiation region, and calculates the above-mentioned calculated value L for each light-emitting element included in the fluorescence image. The determining unit 91 calculates the calculated value L for all the light-emitting elements, and performs sorting (rearrangement) in the order of the magnitude of the calculated value L. FIG. 5 is a diagram showing a sorting result for the calculated values. In FIG. 5, a vertical axis represents a value obtained by converting the calculated value L into a predetermined evaluation index, and a horizontal axis represents the order of calculated values L of the respective light-emitting elements (specifically, the order of evaluation indices of the calculated values L). As shown in FIG. 5, the evaluation index of the calculated value L sharply decreases after a certain point (change point). For example, using such a change point as a threshold value, the determining unit 91 may determine that a light-emitting element whose calculated value L (specifically, an evaluation index of the calculated value L) is smaller than the threshold value is a defective product. Note that, for example, using a reference semiconductor apparatus for determining the threshold value in advance, the threshold value may be determined by comparing a quality determination result for a light-emitting element based on fluorescence (photoluminescence) with a quality determination result based on probing (quality determination result based on an electrical characteristic).

Figure 6:
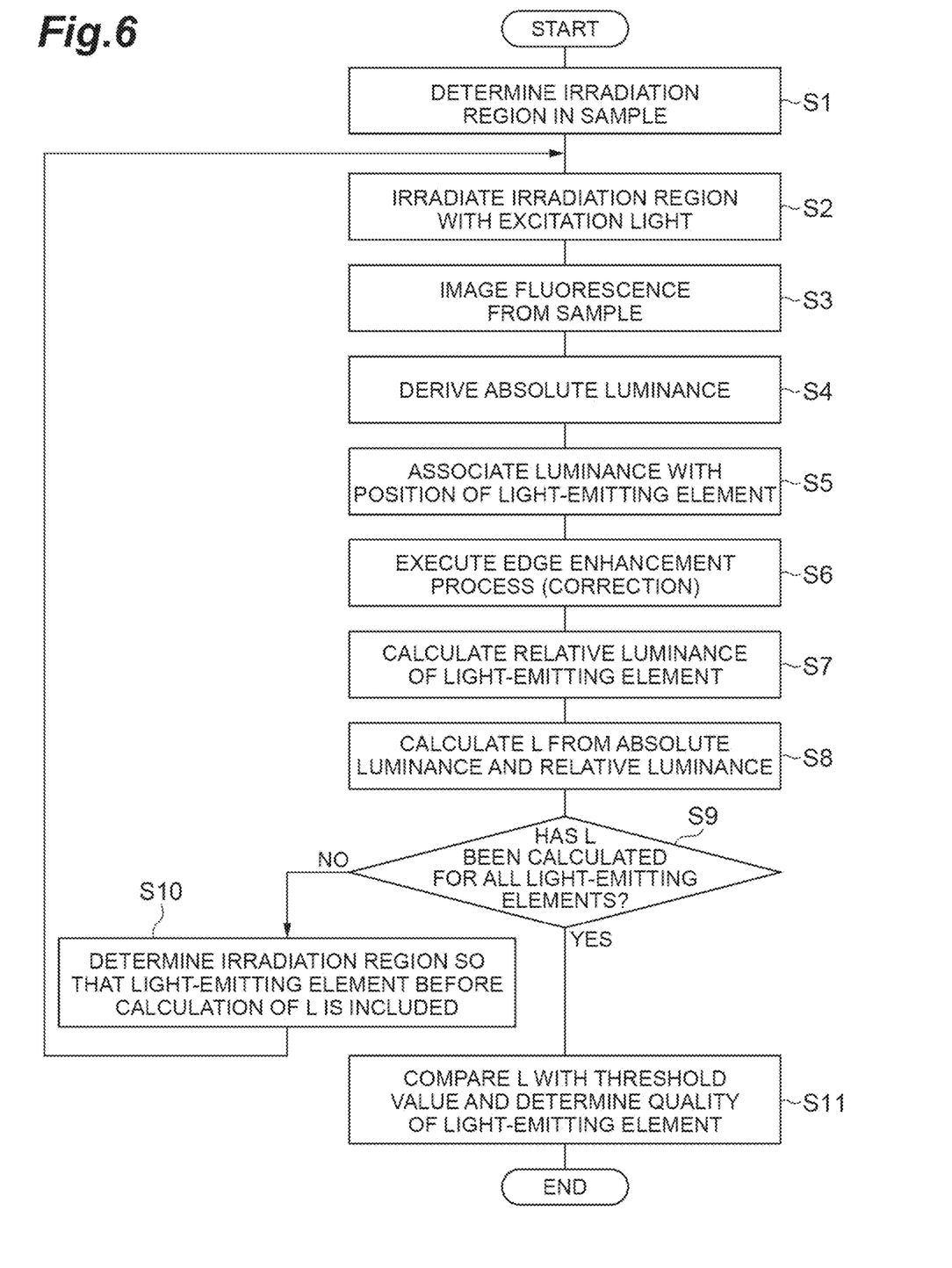
FIG. 6 is a flowchart of an inspection method executed by the inspection apparatus.

Next, a description will be given of a processing procedure of an inspection method (determination of the quality of the light-emitting element) executed by the inspection apparatus 1 with reference to FIG. 6. FIG. 6 is a flowchart of the inspection method executed by the inspection apparatus 1.

As illustrated in FIG. 6, in the inspection apparatus 1, first, the irradiation region in the sample S is determined (step S1). Specifically, the control apparatus 90 determines the irradiation region of excitation light by controlling the XY stage 12.

Subsequently, the excitation light source 20 irradiates the irradiation region with excitation light according to control of the control apparatus 90 (step S2, irradiation step). The excitation light source 20 generates and emits light including a wavelength that excites the light-emitting element of the sample S. The excitation light reaches the dichroic mirror 40 via the optical fiber cable 31 and the light guide lens 32 of the optical system 30, is reflected by the dichroic mirror 40, and is concentrated on the irradiation region of the sample S via the objective lens 51. The light-emitting element of sample S emits fluorescence in response to the excitation light. The fluorescence passes through the dichroic mirror 40, forms an image by the imaging lens 60, and is guided to the camera 70.

The camera 70 images the fluorescence from the sample S (step S3, imaging step). The camera 70 outputs a fluorescence image, which is an imaging result, to the control apparatus 90.

Subsequently, the determining unit 91 of the control apparatus 90 derives the absolute luminance of each region in the fluorescence image (step S4). Subsequently, the determining unit 91 associates the absolute luminance with position information of the light-emitting element by using, for example, a pattern recognition technology (step S5). In this way, the determining unit 91 derives the absolute luminance of the fluorescence from each light-emitting element.

Subsequently, the correcting unit 92 of the control apparatus 90 executes correction for fluorescence from a certain light-emitting element (first light-emitting element) in consideration of an influence of fluorescence from the light-emitting elements arranged around the light-emitting element, specifically, an edge enhancement process (step S6, correction step).

Subsequently, the determining unit 91 of the control apparatus 90 calculates the relative luminance of each light-emitting element based on an absolute luminance of fluorescence after correction by the correcting unit 92 (step S7, relative luminance calculation step). Specifically, the determining unit 91 calculates the relative luminance of the fluorescence from the first light-emitting element based on the fluorescence from the first light-emitting element and the fluorescence from the plurality of second light-emitting elements arranged around the first light-emitting element. That is, the determining unit 91 extracts only a region including the first light-emitting element and the plurality of second light-emitting elements (that is, performs a mask process), and calculates a shift amount of the luminance of the fluorescence from the first light-emitting element (shift amount from a luminance average in a mask) as the relative luminance of the fluorescence from the first light-emitting element.

Subsequently, the determining unit 91 of the control apparatus 90 calculates the calculated value L based on the absolute luminance P and the relative luminance Q of the fluorescence from the first light-emitting element (step S8). The determining unit 91 may calculate, for example, the product of the absolute luminance P and the relative luminance Q of the fluorescence from the first light-emitting element as the calculated value L. Further, the determining unit 91 may calculate the product of the absolute luminance P to the mth power (in is a positive number) and the relative luminance Q to the nth power (n is a positive number) of the fluorescence from the first light-emitting element as the calculated value L. The determining unit 91 calculates the calculated value L for each light-emitting element included in the fluorescence image.

Subsequently, the determining unit 91 of the control apparatus 90 determines whether or not the above-mentioned calculated value L is calculated for all the light-emitting elements (light-emitting elements to be determined) of the sample S (step S9). When a light-emitting element before calculation of the calculated value L is present in step S9, the control apparatus 90 controls the XY stage 12 so that the light-emitting element before calculation is included in the irradiation region (step S10). Thereafter, processing from step S2 is performed again.

When the calculated value L has been calculated for all the light-emitting elements in step S9, the determining unit 91 of the control apparatus 90 performs sorting in the order of the magnitude of the calculated value L (see FIG. 5), compares the calculated value L with a predetermined threshold value, and determines that a light-emitting element whose calculated value L is larger than the threshold value is "non-defective" and a light-emitting element whose calculated value L is smaller than the threshold value is "defective" (step S11, determination step). Note that a light-emitting element whose calculated value L is the same as the threshold value may be regarded as "non-defective" or "defective". The flowchart of the inspection method executed by the inspection apparatus 1 has been described above.

Next, a description will be given of actions and effects of the present embodiment.

The inspection apparatus 1 according to the present embodiment is an inspection apparatus for inspecting the sample S in which the plurality of light-emitting elements including the first light-emitting element and the second light-emitting element arranged around the first light-emitting element is formed, and the inspection apparatus includes the excitation light source 20 that generates excitation light to irradiate the sample S, the camera 70 that images fluorescence from the sample S, and the determining unit 91 of the control apparatus 90 that calculates a relative luminance of fluorescence from the first light-emitting element based on the fluorescence from the first light-emitting element and the fluorescence from the second light-emitting element imaged by the camera 70, and compares a calculated value based on the absolute luminance and the relative luminance of the fluorescence from the first light-emitting element with a predetermined threshold value, thereby determining the quality of the first light-emitting element.

In the inspection apparatus 1, the relative luminance of the first light-emitting element is calculated based on the fluorescence of the first light-emitting element and the fluorescence of the second light-emitting element irradiated with excitation light, a calculated value based on the relative luminance and the absolute luminance of the fluorescence of the first light-emitting element is compared with a predetermined threshold value, and the quality of the first light-emitting element is determined. For example, when the light-emitting element to be determined and the light-emitting element around the light-emitting element (light-emitting element group) are covered with dust, etc., and become a dark region, the relative luminance of the light-emitting element to be determined does not decrease even though the absolute luminance of the florescence of all the light-emitting elements included in the light-emitting element group is extremely low (that is, defective products). Thus, when the quality is determined based on the relative luminance, there is concern that the light-emitting element to be determined may be determined to be a non-defective product. In this regard, in the inspection apparatus 1, the quality of the light-emitting element is determined based on the calculated value calculated from the absolute luminance and the relative luminance in consideration of not only the relative luminance but also the absolute luminance. Thus, when the light-emitting element group becomes the dark region as described above, a light-emitting element having an extremely low absolute luminance even though a relative luminance is high may be determined to be a defective product. That is, it is possible to accurately determine the quality of the light-emitting element based on photoluminescence.

In the inspection apparatus 1, the determining unit 91 calculates the product of the absolute luminance and the relative luminance of the fluorescence from the first light-emitting element as a calculated value, and determines the first light-emitting element to be a defective product when the calculated value is smaller than a threshold value. When the product of an absolute luminance and a relative luminance is calculated, a calculated value of a light-emitting element whose absolute luminance is extremely low (close to 0) may be appropriately set to a small value, so that the light-emitting element can be appropriately determined to be a defective product.

In the inspection apparatus 1, the determining unit 91 calculates the product of the absolute luminance to the mth power (in is a positive number) and the relative luminance to the nth power (n is a positive number) of the fluorescence from the first light-emitting element as a calculated value, and determines the first light-emitting element to be a defective product when the calculated value is smaller than a threshold value. When the product of the powers of the absolute luminance and the relative luminance is calculated, a calculated value of a light-emitting element whose absolute luminance is extremely low (close to 0) can be set to a significantly smaller value, and the light-emitting element can be appropriately determined to be a defective product.

The control apparatus 90 of the inspection apparatus 1 includes the correcting unit 92 that corrects the fluorescence from the first light-emitting element in consideration of the influence of the fluorescence from the light-emitting element arranged around the first light-emitting element. It is considered that the fluorescence of the first light-emitting element imaged by the camera 70 is affected by the fluorescence from the light-emitting element arranged around the first light-emitting element. In this regard, when the fluorescence from the first light-emitting element is corrected in consideration of the influence of the fluorescence from the surrounding light-emitting element, the quality of the first light-emitting element can be determined with higher accuracy based on the original fluorescence from the first light-emitting element.

In the inspection apparatus 1, the determining unit 91 may acquire the fluorescence from the light-emitting element from a region excluding the edge portion of the light-emitting element in a region of the sample S imaged by the camera 70. In general, the light-emitting element is formed in a mesa shape in the sample S and has an inclined portion at the edge portion. Such an inclined portion reflects light, and when the luminance is calculated including the inclined portion, there is concern that the luminance of the fluorescence from the light-emitting element cannot be appropriately calculated. In this regard, by acquiring fluorescence (fluorescence from the light-emitting element) from the region excluding the edge portion such as the inclined portion, it is possible to appropriately acquire the fluorescence from the light-emitting element by eliminating the influence of the inclined portion.

The embodiment of the invention has been described above. However, the invention is not limited to the embodiment. For example, a description has been given on the assumption that determining unit 91 derives the calculated value to be compared with the threshold value in determination of the quality from the product of the relative luminance and the absolute luminance. However, the invention is not limited thereto. That is, it is sufficient that the determining unit 91 derives the calculated value in consideration of both the relative luminance and the absolute luminance, and the determining unit 91 may derive the calculated value by an operation other than the product, etc.

REFERENCE SIGNS LIST

1: inspection apparatus, 20: excitation light source, 70: camera (imaging unit), 91: determining unit, 92: correcting unit.

The invention claimed is:

1. A method of inspecting an object in which a plurality of light-emitting elements including a first light-emitting element and a second light-emitting element arranged around the first light-emitting element is formed, the method comprising:
irradiating the object with excitation light;
imaging fluorescence from the object;
calculating a relative luminance of fluorescence from the first light-emitting element based on the fluorescence from the first light-emitting element and fluorescence from the second light-emitting element imaged; and
determining a quality of the first light-emitting element by comparing a calculated value based on an absolute luminance and the relative luminance of the fluorescence from the first light-emitting element with a predetermined threshold value.

2. The inspection method according to claim 1, wherein a product of the absolute luminance and the relative luminance of the fluorescence from the first light-emitting element is calculated as the calculated value, and the first light-emitting element is determined to be a defective product when the calculated value is smaller than the threshold value.

3. The inspection method according to claim 1, wherein a product of the absolute luminance to an mth power (m is a positive number) and the relative luminance to an nth power (n is a positive number) of the fluorescence from the first light-emitting element is calculated as the calculated value, and the first light-emitting element is determined to be a defective product when the calculated value is smaller than the threshold value.

4. The inspection method according to claim 1, further comprising
correcting the fluorescence from the first light-emitting element in consideration of an influence of fluorescence from a light-emitting element arranged around the first light-emitting element after the imaging and before the relative luminance calculation.

5. The inspection method according to claim 1, wherein fluorescence from a light-emitting element is acquired from a region excluding an edge portion of the light-emitting element in a region of the object imaged.

6. An inspection system for inspecting an object according to the method of claim 1, comprising:
an excitation light source configured to generate the excitation light to irradiate the object;
an imager configured to image the fluorescence from the object; and
a determining unit configured to calculate the relative luminance of fluorescence from the first light-emitting element based on the fluorescence from the first light-emitting element and the fluorescence from the second light-emitting element imaged by the imager, and compare the calculated value based on the absolute luminance and the relative luminance of the fluorescence from the first light-emitting element with the predetermined threshold value, thereby determining the quality of the first light-emitting element.

7. The inspection system according to claim 6, wherein the determining unit calculates a product of the absolute luminance and the relative luminance of the fluorescence from the first light-emitting element as the calculated value, and determines the first light-emitting element to be a defective product when the calculated value is smaller than the threshold value.

8. The inspection system according to claim 6, wherein the determining unit calculates a product of the absolute luminance to an mth power (m is a positive number) and the relative luminance to an nth power (n is a positive number) of the fluorescence from the first light-emitting element as the calculated value, and determines the first light-emitting element to be a defective product when the calculated value is smaller than the threshold value.

9. The inspection system according to claim 6, further comprising
a correcting unit configured to correct the fluorescence from the first light-emitting element in consideration of an influence of fluorescence from a light-emitting element arranged around the first light-emitting element.

10. The inspection system according to claim 6, wherein the determining unit acquires fluorescence from a light-emitting element from a region excluding an edge portion of the light-emitting element in a region of the object imaged by the imager.

* * * * *